US006847358B1

(12) United States Patent
Ford et al.

(10) Patent No.: US 6,847,358 B1
(45) Date of Patent: Jan. 25, 2005

(54) WORKSTATION FOR PROCESSING AND PRODUCING A VIDEO SIGNAL

(75) Inventors: Jeff S. Ford, Madison, AL (US); Claude Denton, Beaverton, OR (US); Jeff Belote, Madison, AL (US); David J. Stradley, Madison, AL (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 09/632,558

(22) Filed: Aug. 4, 2000

Related U.S. Application Data

(60) Provisional application No. 60/147,668, filed on Aug. 6, 1999, and provisional application No. 60/147,609, filed on Aug. 6, 1999.

(51) Int. Cl.[7] .............................................. G06T 15/00
(52) U.S. Cl. ..................................................... 345/419
(58) Field of Search ................................ 345/419, 420, 345/619

(56) References Cited

U.S. PATENT DOCUMENTS

| 4,817,175 A | 3/1989 | Tenenbaum et al. |
| 5,027,212 A | 6/1991 | Marlton et al. ............. 358/183 |
| 5,191,645 A | 3/1993 | Carlucci et al. |
| 5,343,250 A | 8/1994 | Iwamura ..................... 348/564 |
| 5,353,119 A | 10/1994 | Dorricott et al. |
| 5,434,592 A | 7/1995 | Dinwiddie, Jr. et al. |
| 5,572,453 A * | 11/1996 | Miyake et al. ............... 364/736 |
| 5,606,652 A | 2/1997 | Silverbrook |
| 5,646,651 A | 7/1997 | Spannaus et al. ........... 345/185 |

(List continued on next page.)

FOREIGN PATENT DOCUMENTS

| EP | 493881 A1 | 7/1992 |
| EP | 574748 A1 | 12/1993 |
| EP | 814 401 A2 | 12/1997 |
| EP | 862334 A2 | 9/1998 |
| EP | 867812 | 9/1998 |
| WO | WO 93/21574 | 10/1993 |
| WO | WO 99/12091 | 3/1999 |

OTHER PUBLICATIONS

Naoi et al., "IDATEN: A Reconfigurable Video–Rate Color Image Processing System," Systems & Computers in Japan, vol. 23, No. 13, 1992, pp. 76–89.

Northcutt et al., "A high resolution video workstation," Signal Processing: Image Communication, vol. 4, No. 4, 1992, pp. 445–455.

Willner, "Transforming the PC into a TV, Radio, VCR, and Video Editing Studio," Wescon Technical Papers, Western Periodicals Co., 1995, pp. 743–748.

Bach et al., "Multimediales TV–Gerat," Radio Fernsehen Elektronik, Verlag Technic, vol. 45, No. 9, 1996, pp. 28, 30 and 31.

(List continued on next page.)

Primary Examiner—Phu K. Nguyen
(74) Attorney, Agent, or Firm—Lee & Hayes, PLLC

(57) ABSTRACT

A workstation for processing and producing a video signal comprises a video input system, a video graphics processor, and a video output system. The video input system may comprise a video input module, a first video pipeline, and a second video pipeline. The video output system may comprise a receiver, a video pipeline and a video output module. In addition, the video input system may comprise a video input module having a specific configuration and a video processing module having a connector for coupling the video input module, the specific configuration of the video input module setting the characteristics of the video processing module. The video output system may comprise a video processing module having a connector for coupling a video output module and a video output module having a specific configuration, the specific configuration of the video output module setting the characteristics of the video processing module.

64 Claims, 10 Drawing Sheets

U.S. PATENT DOCUMENTS

| | | | |
|---|---|---|---|
| 5,655,112 A | 8/1997 | MacInnis | 395/501 |
| 5,734,589 A | 3/1998 | Kostreski et al. | 364/512 |
| 5,784,050 A | 7/1998 | Corry | 345/154 |
| 5,799,204 A | 8/1998 | Pesto, Jr. | |
| 5,864,342 A | 1/1999 | Kajiya et al. | |
| 5,900,917 A | 5/1999 | Yanai et al. | |
| 5,929,870 A | 7/1999 | Takeuchi | |
| 5,937,173 A | 8/1999 | Olarig et al. | |
| 5,973,742 A | 10/1999 | Gardyne et al. | |
| 6,079,009 A * | 6/2000 | Wise et al. | 712/18 |
| 6,088,045 A | 7/2000 | Lumelsky et al. | |
| 6,115,507 A | 9/2000 | Eglit et al. | 382/300 |
| 6,130,660 A | 10/2000 | Imsand | |
| 6,154,600 A | 11/2000 | Newman et al. | |
| 6,184,906 B1 | 2/2001 | Wang et al. | |
| 6,195,079 B1 | 2/2001 | Reddy | 345/121 |
| 6,243,137 B1 | 6/2001 | Aihara | 348/372 |
| 6,295,090 B1 | 9/2001 | Voltz et al. | |
| 6,314,569 B1 | 11/2001 | Chernock et al. | |
| 6,323,854 B1 | 11/2001 | Knox et al. | |
| 6,329,996 B1 | 12/2001 | Bowen et al. | |
| 6,366,325 B1 | 4/2002 | Wang | |
| 6,433,796 B1 | 8/2002 | Taguchi | |
| 6,462,786 B1 | 10/2002 | Glen et al. | |
| 6,476,816 B1 | 11/2002 | Deming et al. | |
| 2002/0145610 A1 | 10/2002 | Barilovits et al. | |

OTHER PUBLICATIONS

Mapleson, "Sirius Video: Broadcast–Quality Digital Video," visited on Dec. 19, 2002 at <URL:http://sgi–cartsys.net/mapleson/siriusvideo.html>, cited in PCT Search Report for PCT/US00/21361, dated Nov. 3, 2000.

Search Report issued in PCT/US00/21356, mailed Oct. 2000, published in WO 01/11456.

Search Report issued in PCT/US00/21361, mailed Nov. 2000, published in WO 01/11458.

Search Report issued in PCT/US00/21363, mailed Oct. 2000, published in WO 01/11460.

Search Report issued in PCT/US00/21362, mailed Nov. 2000, published in WO 01/11459.

* cited by examiner

WORKSTATION FOR PROCESSING AND PRODUCING A VIDEO SIGNAL

PRIORITY

This application claims priority from co-pending provisional U.S. patent application Ser. No. 60/147,668, filed Aug. 6, 1999, entitled "GRAPHICS WORKSTATION" and, the disclosure of which is incorporated herein, in its entirety, by reference and co-pending provisional U.S. Patent Application Ser. No. 60/147,609, filed Aug. 6, 1999, entitled "DATA PACKER FOR GRAPHICAL WORKSTATION" and, the disclosure of which is incorporated herein, in its entirety, by reference.

CROSS REFERENCE TO RELATED APPLICATIONS

This application is related to U.S. patent application Ser. No. 09/632,662, filed on even date herewith, entitled "SYSTEM AND METHOD FOR PRE-PROCESSING A VIDEO SIGNAL" and, naming Jeff S. Ford and David J. Stradley as inventors, the disclosure of which is incorporated herein, in its entirety, by reference, U.S. patent application Ser. No. 09/632,452, filed on even date herewith, entitled "SYSTEM AND METHOD FOR PRODUCING A VIDEO SIGNAL" and, naming Jeff S. Ford and Claude Denton as inventors, the disclosure of which is incorporated herein, in its entirety, by reference, U.S. patent application Ser. No. 09/632,605, filed on even date herewith, entitled "VIDEO CARD WITH INTERCHANGEABLE CONNECTOR MODULE" and, naming Jeff S. Ford and Jeff Belote as inventors, the disclosure of which is incorporated herein, in its entirety, by reference, U.S. patent application Ser. No. 09/632,443, filed on even date herewith, entitled "SYSTEM AND METHOD FOR FRAME RATE MATCHING" and, naming Jeff S. Ford as inventor, the disclosure of which is incorporated herein, in its entirety, by reference, and U.S. patent application Ser. No. 09/632,451, filed on even date herewith, entitled "SYSTEM AND METHOD FOR PACKING AND UNPACKING VIDEO DATA" and, naming Jeff S. Ford, Arthur McKinney and Craig Jordan as inventors, the disclosure of which is incorporated herein, in its entirety, by reference.

FIELD OF THE INVENTION

The invention generally relates to a video graphics workstation and, more particularly, the invention relates to the pre-processing of a video signal and the production of a video signal.

BACKGROUND OF THE INVENTION

In general, a video graphics workstation is a system of hardware and software that allows a user to process a video signal for use in a number of different applications. For example, the user may process a video signal for display on a computer monitor, for storage on a computer-readable storage medium, for display on a television, or for storage on a video tape.

Typically, however, video graphics workstations are designed to process particular video signals. Thus, most video graphics workstations are not scalable. In other words, most video graphics workstations are not designed to adapt to the changing needs of the workstation's user.

SUMMARY OF THE INVENTION

In accordance with one aspect of the invention, a workstation for processing and producing video signals comprises a video input system and a video graphics processor. The video input system comprises a video input module, a first video pipeline, and a second video pipeline. The video input module receives and forwards one or more live video signals, producing a forwarded video signal for each received live video signal. The first video pipeline pre-processes $VS_1$, wherein $VS_1$ is a first stored video signal or one of the forwarded video signals produced in the video input module, producing a first pre-processed video signal. The second video pipeline pre-processes $VS_2$, wherein $VS_2$ is the same video signal being pre-processed in the first video pipeline, one of the other forwarded video signals produced in the video input module, or a second stored video signal, producing a second pre-processed video signal. The video graphics processor processes $VS_3$, wherein $VS_3$ is a third stored video signal, the first pre-processed video signal, or the second pre-processed video signal, producing a processed video signal.

In a further embodiment of the invention, the workstation may further comprise a video output system, the video output system producing a formatted video signal. The video output system may further comprise a receiver for receiving $VS_4$, wherein $VS_4$ is the first pre-processed video signal, the second pre-processed video signal, or the processed video signal, a video pipeline for post-processing $VS_4$, the video pipeline operating in conjunction with the video graphics processor and producing a post-processed video signal, and a video output module for converting the post-processed video signal, the video output module producing the formatted video signal.

In accordance with another aspect of the invention, a workstation for processing and producing video signals comprises a video graphics processor for processing a video signal, the video graphics processor producing a processed video signal, and a video output system. The video output system comprises a receiver for receiving the processed video signal, a video pipeline for post-processing the processed video signal, the video pipeline producing a post-processed video signal, and a video output module for converting the post-processed video signal, the video output module producing a formatted video signal.

In accordance with still another aspect of the invention, a workstation for processing and producing video signals comprises a video graphics processor for processing a video signal, the video graphics processor producing a processed video signal, and a video output system. The video output system comprises a video processing module for post-processing the processed video signal, the video processing module producing a post-processed video signal and having a connector for coupling a video output module, and a video output module for converting the post-processed video signal, the video output module having a specific configuration and producing a formatted video signal, the specific configuration of the video output module setting the characteristics of the video processing module.

In a further embodiment of the invention, the video output module may further comprise a buffer for storing the post-processed video signal, a processor for converting the post-processed video signal into the formatted video signal, and a transmitter for transmitting the formatted video signal.

In accordance with yet another aspect of the invention, a workstation for processing and producing a video signal comprises a video input system and a video graphics processor. The video input system comprises a video input module for converting a live video signal, the video input module having a specific configuration and producing a formatted video signal, and a video processing module for pre-processing the formatted video signal, the video processing module producing a pre-processed video signal, the video processing module having a connector for coupling the video input module, the specific configuration of the video input module setting the characteristics of the video processing module. The video graphics processor processes the pre-processed video signal, producing a processed video signal.

In a further embodiment of the invention, the video input module may further comprise a first receiver for receiving the live video signal, a processor for converting the live video signal into the formatted video signal, and a buffer for storing the formatted video signal.

In accordance with still yet another aspect of the invention, a workstation for processing and producing a video signal comprises a video input system and a video output system. In one embodiment of the invention, the video input system comprises a video input module for receiving and forwarding one or more live video signals, the video input module producing a forwarded video signal for each received live video signal, a first video pipeline for pre-processing $VS_1$, wherein $VS_1$ is a first stored video signal or one of the forwarded video signals produced in the video input module, the first video pipeline producing a first pre-processed video signal, and a second video pipeline for pre-processing $VS_2$, wherein $VS_2$ is the same video signal being pre-processed in the first video pipeline, one of the other forwarded video signals produced in the video input module, or a second stored video signal, the second video pipeline producing a second pre-processed video signal. In this embodiment, the video output system comprises a receiver for receiving $VS_3$, wherein $VS_3$ is a third stored video signal, the first pre-processed video signal, or the second pre-processed video signal, a video pipeline for post-processing $VS_3$, the video pipeline producing a post-processed video signal, and a video output module for converting the post-processed video signal, the video output module producing a formatted video signal.

In another embodiment of the invention, the video input system comprises a video input module for converting a live video signal, the video input module having a specific configuration and producing a formatted video signal, and a video processing module for pre-processing the formatted video signal, the video processing module producing a pre-processed video signal, the video processing module having a connector for coupling the video input module, the specific configuration of the video input module setting the characteristics of the video processing module. In this embodiment, the video output system comprises a video processing module for post-processing the pre-processed video signal, the video processing module producing a post-processed video signal and having a connector for coupling a video output module, and a video output module for converting the post-processed video signal, the video output module having a specific configuration and producing a formatted video signal, the specific configuration of the video output module setting the characteristics of the video processing module.

In alternate embodiments for all aspects of the invention, the video input system may include an ancillary data extractor for removing ancillary data from at least one of the live video signals, and the video output system may include an ancillary data injector for inserting ancillary data into the post-processed video signal. The video output system may also include a generator locking device.

In other alternate embodiments for all aspects of the invention, the live video signal may be an analog composite video signal, an analog component video signal, a serial digital composite video signal, a serial digital component video signal, a parallel digital composite video signal, or a parallel digital component video signal. Further, the pre-processed video signal may be an RGB encoded video signal, an RGBA encoded video signal, a YUV-Type encoded video signal, or a YUVA-Type encoded video signal. In addition, the formatted video signal may be an analog composite video signal, an analog component video signal, a serial digital composite video signal, a serial digital component video signal, a parallel digital composite video signal, or a parallel digital component video signal.

In still other alternate embodiments for all aspects of the invention, the process of pre-processing may include changing the sample rate of the video signal being pre-processed, gamma removal, gamma insertion, color space conversion, dithering, and scaling. In addition, the process of pre-processing may include addressing on a frame-by-frame basis the video signal being pre-processed. Further, the video input system may be a Peripheral Component Interconnect circuit board.

In yet other alternate embodiments for all aspects of the invention, the process of post-processing may include region of interest selection, frame rate matching, scaling, framing, letter boxing, changing the sample rate of the video signal being post-processed, gamma removal, gamma insertion, color space conversion, and changing frames of video data into interleaved fields of video data. In addition, the process of post-processing may include addressing on a frame-by-frame basis the video signal being pre-processed. Further, the video output system may be a Peripheral Component Interconnect circuit board.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE INVENTION

In accordance with one embodiment of the invention, a video graphics workstation includes three sub-systems—a video input system, a video graphics processor, and a video output system. In general, the video input system pre-processes video signals, the video graphics processor processes and/or displays video signals and graphics input, and the video output system produces video signals. The video signals processed and produced may be analog video signals or digital video signals.

Figure 1:
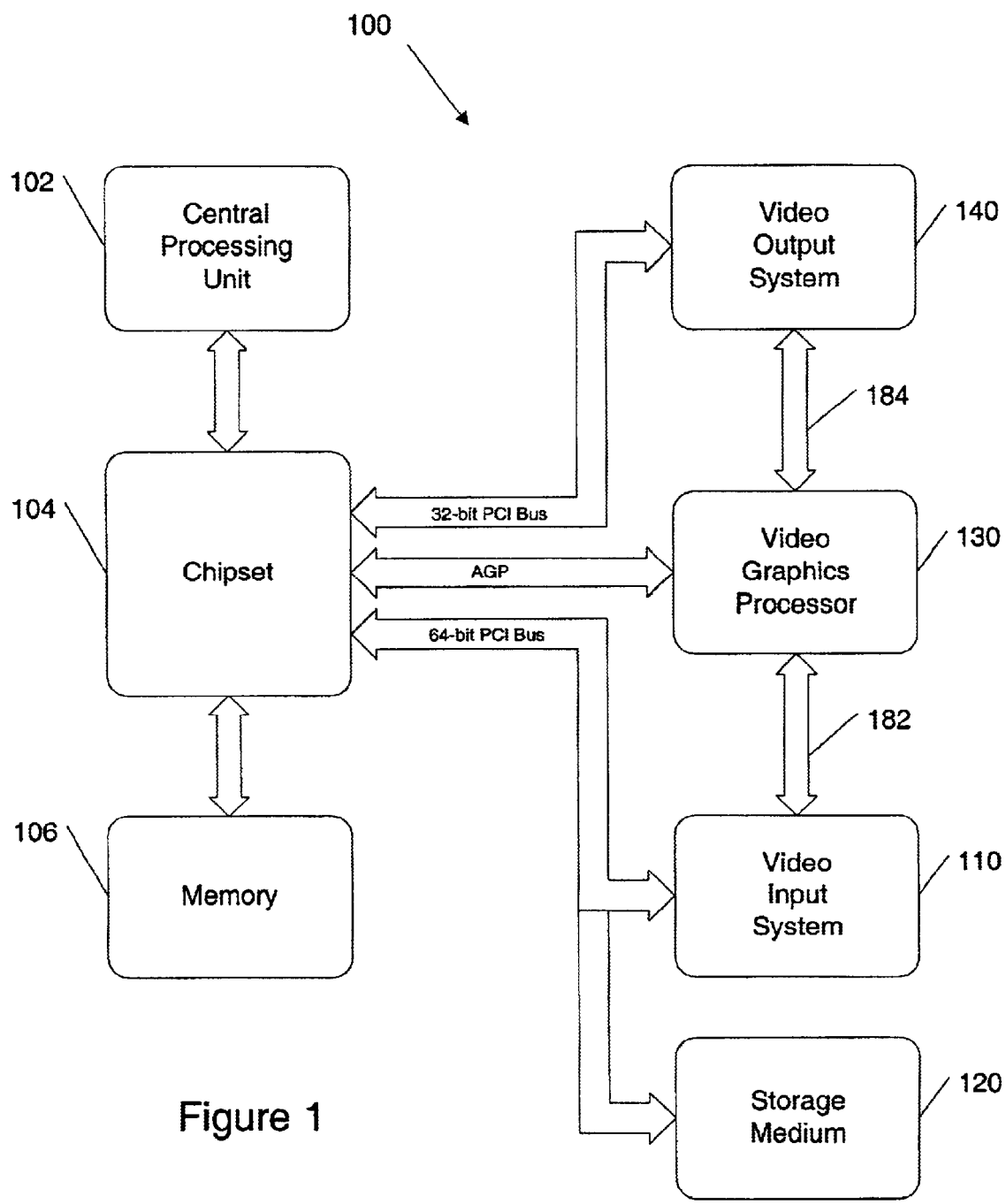
FIG. 1 shows a block diagram of an exemplary video graphics workstation for implementing the various embodiments of the invention.

FIG. 1 shows a block diagram of an exemplary video graphics workstation for implementing the various embodiments of the invention. Video graphics workstation 100 includes central processing unit 102, chipset 104, memory 106, two Peripheral Component Interconnect ("PCI") buses—a 64-bit PCI bus and a 32-bit PCI bus, and an Accelerated Graphics Port ("AGP"). Video input system 110 and storage medium 120 connect to chipset 104 via the 64-bit PCI bus. Video graphics processor 130 connects to chipset 104 via the AGP. Video output system 140 connects to chipset 104 via the 32-bit PCI bus. In addition, video input system 110 connects to video graphics processor 130 via local bus 182 and video output system 140 connects to video graphics processor 130 via local bus 184.

A. Video Input System

Figure 2A:
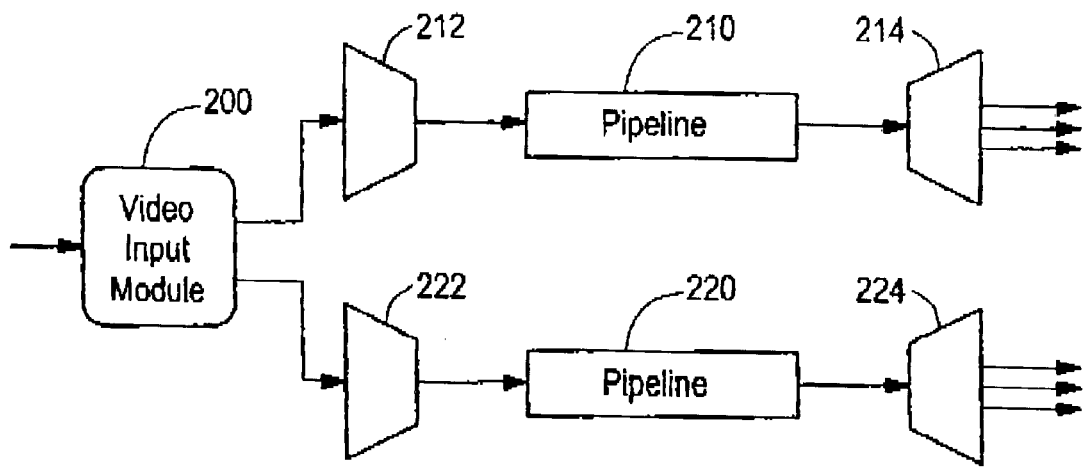
FIGS. 2a through 2b show various exemplary embodiments for a video input system for use in a video graphics workstation.
Figure 2B:
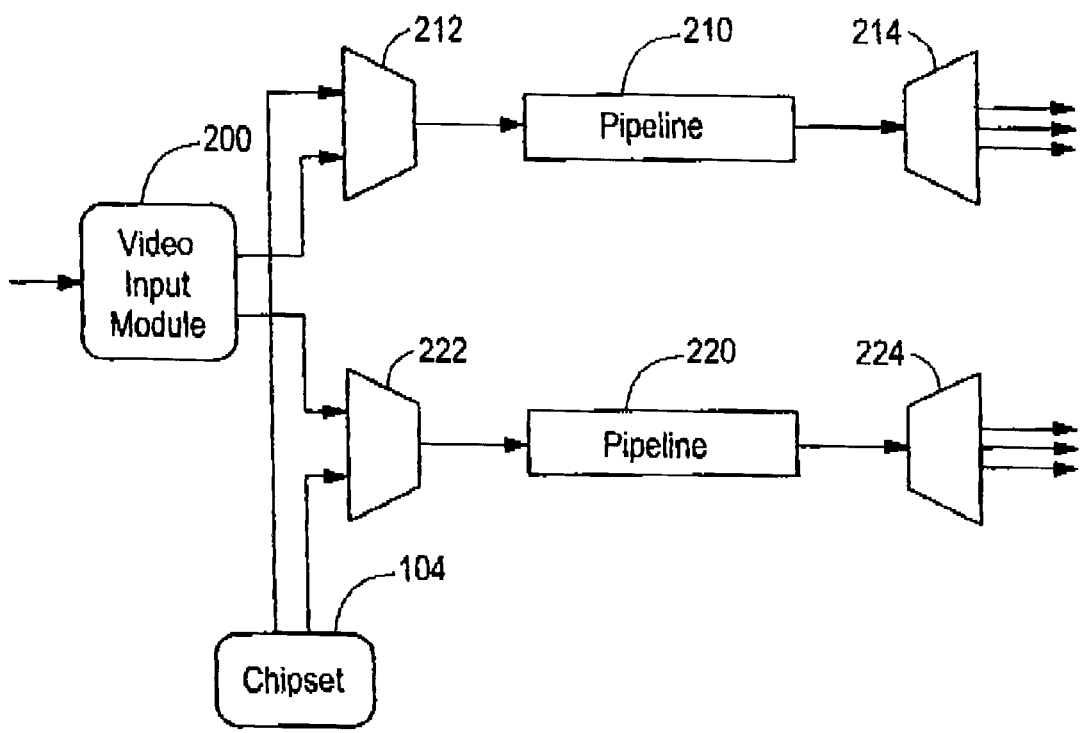

FIGS. 2a through 2b show various exemplary embodiments for video input system 110. In particular, FIG. 2a shows an exemplary embodiment for pre-processing a live video signal in video input system 110. The process of pre-processing a video signal includes, among other things, up sampling, down sampling, gamma insertion, gamma removal, color space conversion, scaling and dithering. For purposes of understanding and reference, and without intending to limit the meaning the above-identified processes have to a person of ordinary skill in the art, listed below are definitions for the above-identified processes:

| PROCESS | DEFINITION |
| --- | --- |
| Up Sampling | Process of increasing the amount of digital data used to represent an image |
| Down Sampling | Process of decreasing the amount of digital data used to represent an image |
| Gamma Insertion | Process of inserting a value to compensate for the non-linear characteristics of an output device (e.g., a computer monitor) |
| Gamma Removal | Process of removing a value inserted to compensate for the non-linear characteristics of an output device (e.g., a computer monitor) |
| Color Space Conversion | Process of converting between different color encoding schemes (e.g., between a component color scheme and a composite color scheme) |
| Scaling | Process of changing the resolution of an image |
| Dithering | Process of combining colors to trick the eye into seeing more colors than the system can actually display |

In addition, pre-processing may include addressing on a frame-by-frame basis the video signal being pre-processed. In video, a frame is a single complete image. In frame-by-frame addressing, video input system 110 may pre-process one frame of a video signal different than, for example, the next frame of the video signal.

In the embodiment shown in FIG. 2a, video input system 110 includes video input module 200, input multiplexer 212, input multiplexer 222, pipeline 210, pipeline 220, output multiplexer 214, and output multiplexer 224. Video input module 200 receives a live video signal and forwards the live video signal to, for example, a buffer (not shown) for transfer to pipeline 210 and/or pipeline 220. The live video signal may be an analog video signal or a digital video signal. If the live video signal is an analog video signal, then video input module 200 converts the live video signal into a computer-readable format.

The input multiplexers, multiplexer 212 and multiplexer 222, route the respective video signal to the pipelines. In particular, multiplexer 212 routes video signals to pipeline 210 and multiplexer 222 routes video signals to pipeline 220. The pipelines, pipeline 210 and pipeline 220, pre-process the forwarded video signal. The output multiplexers, multiplexer 214 and multiplexer 224, route the pre-processed video signals to, for example, various output buffers (not shown) accessible to video graphics workstation 100. For example, the pre-processed video signal may be forwarded, via the 64-bit PCI bus and the AGP, to video graphics processor 130. Or, the pre-processed video signal may be forwarded, via the 64-bit PCI bus and the 32-bit PCI bus, to video output system 140. The pre-processed video signal may also be forwarded, via the 64-bit bus, to storage medium 120.

FIG. 2b shows an exemplary embodiment for pre-processing a live video signal and a stored video signal in video input system 110. In this embodiment, pipeline 210 and pipeline 220 pre-process a live video signal and/or a stored video signal. Typically, the stored video signal is forwarded from, for example, storage medium 120, to a buffer (not shown) to allow for efficient transfer of the stored video signal to video input system 110.

With two pipelines, a single live, or stored, video signal may reach pipeline 210 and pipeline 220. Thus, two versions of a single live, or stored, video signal may be generated at the same time. For example, video input system 110 may receive a television signal and pre-process the televison signal via pipeline 210 for display on a computer monitor and via pipeline 220 for storage on storage medium 120. In addition, using frame-by-frame addressing, video input system 110 may pre-process more than two video signals substantially at the same time. In this embodiment, the frames of the different video signals are interleaved and routed to pipeline 210 and pipeline 220. Moreover, video input system 110 may pass a video signal, either live or stored, through pipeline 210 and/or pipeline 220 without pre-processing the video signal.

In a further embodiment of video input system 110, video input module 200 receives and forwards more than one live video signal to, for example, a buffer (not shown) for transfer to pipeline 210 and/or pipeline 220. The live video signals may be analog video signals or digital video signals. If the live video signal is an analog video signal, then video input module 200 converts the live video signal into a computer-readable format. For each received live video signal, video input module 200 produces a forwarded video signal.

In a further embodiment of these exemplary embodiments, video input module 200 includes an ancillary data extractor for removing ancillary data from a live video signal. Typically, the ancillary data is removed from the live video signal prior to receipt of the live video signal in the input multiplexers, multiplexer 212 and multiplexer 214. Ancillary data includes, among other things, audio data and close captioning data.

Figure 3:
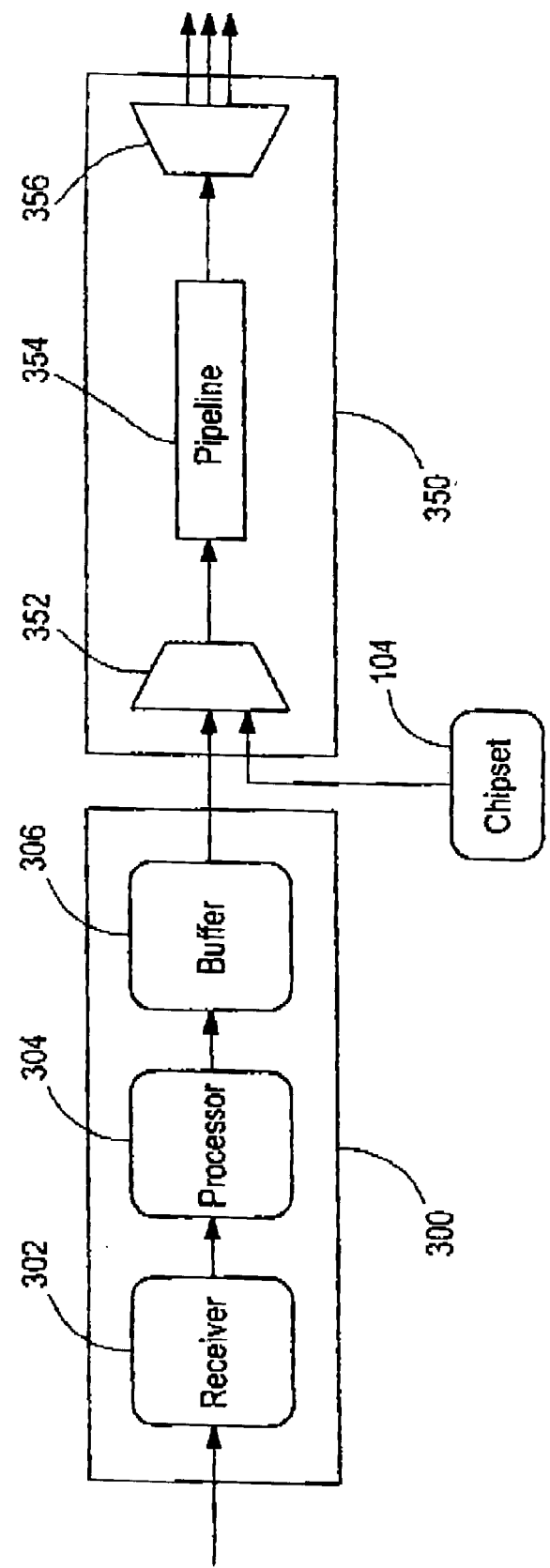
FIG. 3 shows an exemplary embodiment for a scalable video input system for use in a video graphics workstation.

FIG. 3 shows an exemplary embodiment for a scalable video input system 110. In this embodiment, video input system 110 includes video input module 300 and video processing module 350. Video input module 300 includes receiver 302, processor 304, and buffer 306. Receiver 362 receives a live video signal and forwards the live video signal to processor 304. Processor 304 converts the received video signal into a video signal having a common video data format. The formatted video signal is then forwarded to buffer 306 for transfer to video processing module 350. In alternate embodiments of the invention, video input module 300 may include an ancillary data extractor for removing ancillary data from a live video signal.

Video processing module 350 includes input multiplexer 352, pipeline 354, and output multiplexer 356. As discussed above in regard to the embodiments shown in FIG. 2, video processing module 350 pre-processes the formatted video signal and/or a stored video signal and routes the pre-processed video signal to, for example, a buffer (not shown) accessible to video graphics workstation 100. Video processing module 350 may have two pre-processing pipelines. In addition, the pre-processed video signal may be forwarded to video graphics processor 130, video output system 140, and/or storage medium 120.

The common video data format may be an organized bit stream. As noted above, a frame is a single complete image. An image, in turn, is composed of a raster of picture elements, referred to as pixels. A pixel is represented by some number of bits stored, for example, in memory. Pixels are the smallest "units" on a screen that can be given a color (represented with color data) and an opacity (represented with alpha data). Thus, an organized bit stream may include color data, alpha data, or color data and alpha data. For example, a bit stream with color data may include 20-bits for color data. In contrast, a bit stream for alpha data my include 10-bits for alpha data. Pipeline 354 may pre-process color data separate from alpha data. In this embodiment, a color data bit stream may be forwarded on an output different from the output used to forward alpha data.

In these exemplary embodiments, video input module 300 and video processing module 350 are separate modules coupled together via, for example, male/female cables. In one embodiment, video input module 300 is a daughterboard that plugs into video processing module 350. The separation of the various functions of a video input system into a video input module and a video processing module allows for the separation of video input module 300 and video processing module 350.

In turn, the separation of video input module 300 from video processing module 350 allows for the configuration of various video input modules, each configured to receive and process different video signal formats. Because the "input" functions of video input system 110 have been separated from the "processing" functions of video input system 110, video input module 300 may be "exchanged" without the need to replace video processing module 350. Thus, when a user wants to input, for example, a serial digital component video signal into video input system 110 instead of an analog composite video signal, the user "exchanges" the video input module configured for the analog composite video signal with a video input module configured for the serial digital component video signal. In turn, processor 304 (on the "new" video input module) signals video processing module 350 of the new configuration.

Figure 4A:
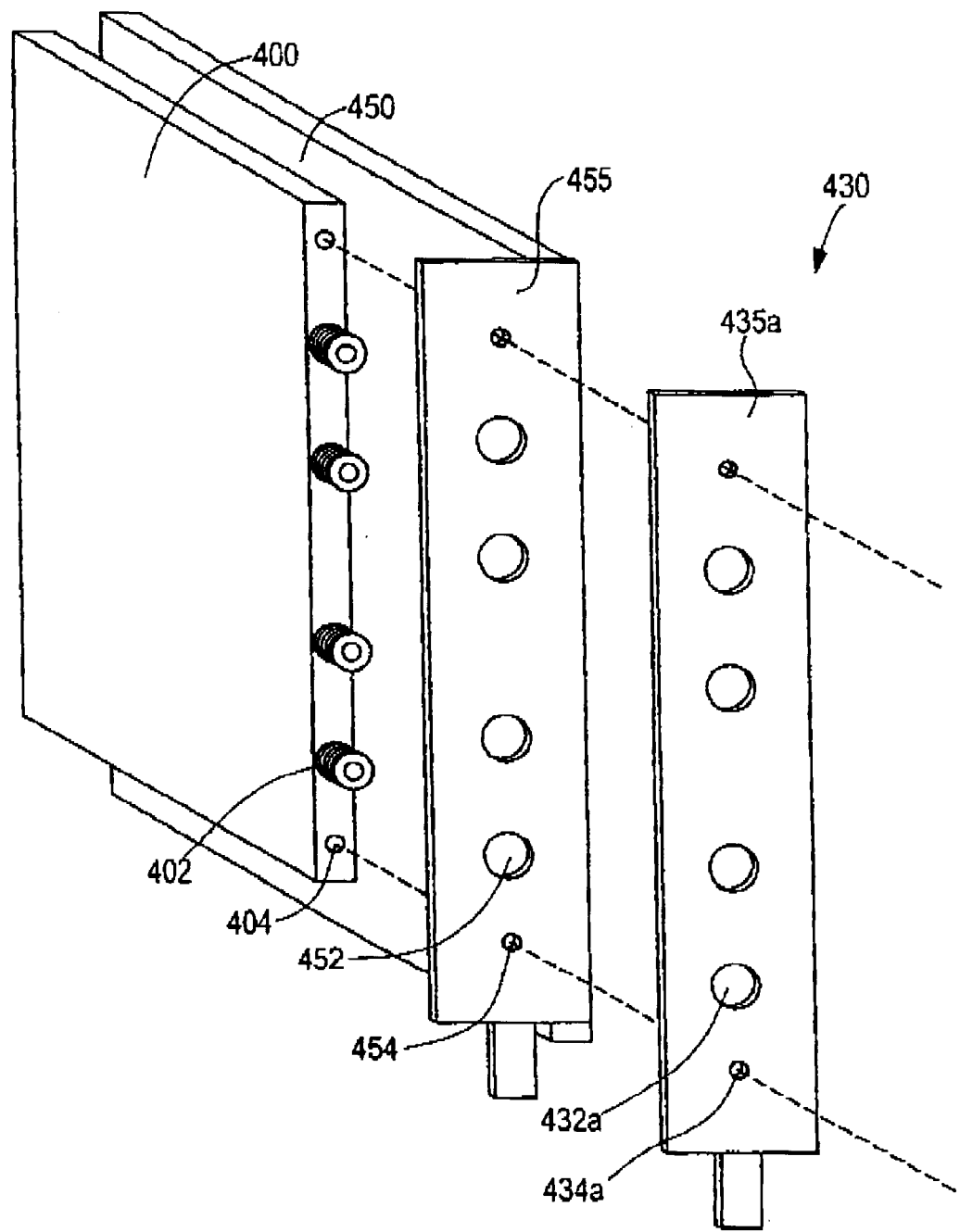
FIGS. 4a and 4b show various exemplary exploded views for mounting an interchangeable connector module to a video processing module.
Figure 4B:
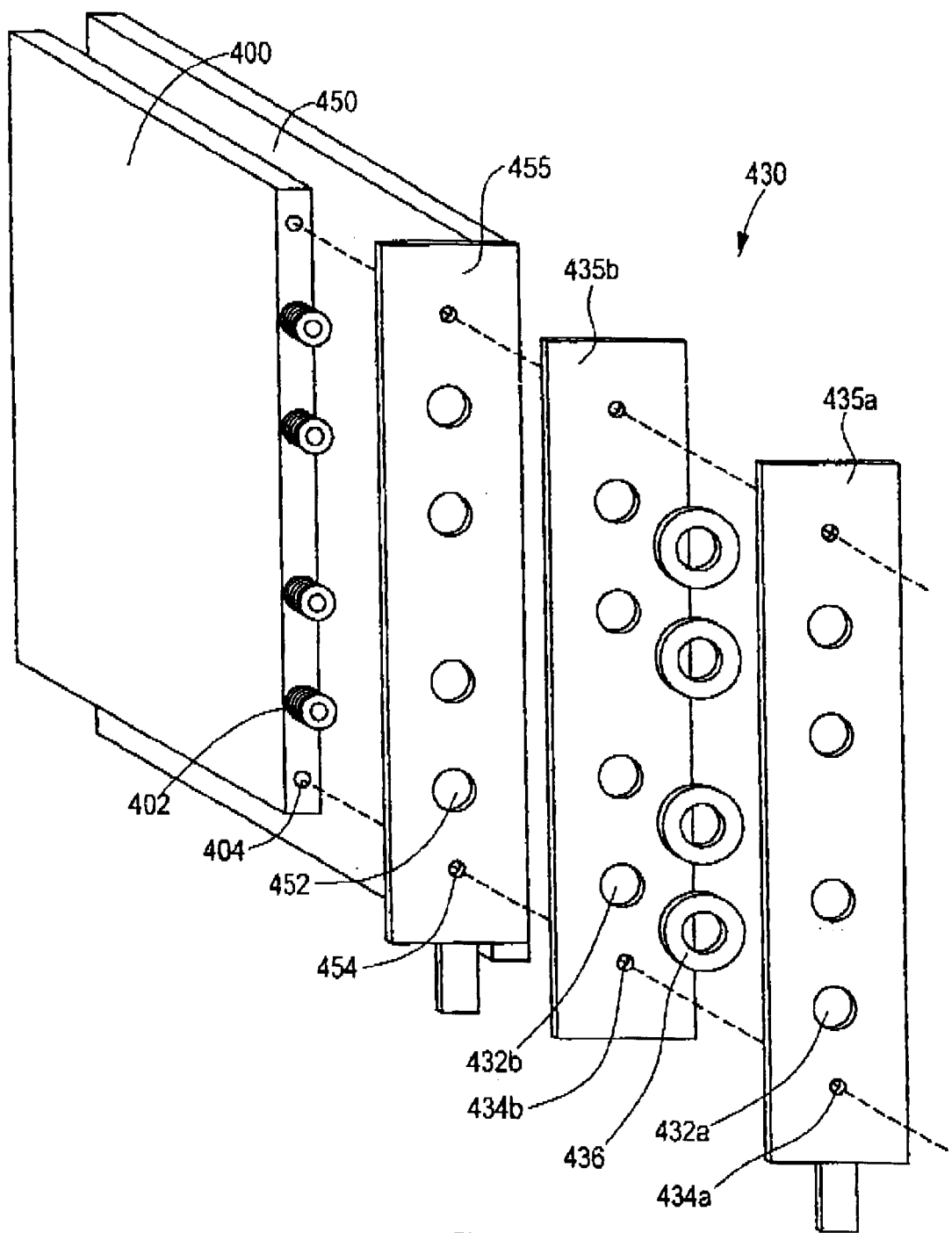

FIGS. 4*a* and 4*b* show various exemplary exploded views for mounting an interchangeable connector module, such as video input module 300, to a processing module, such as video processing module 350. In FIG. 4*a*, interchangeable connector module 400 includes connectors 402 and mounting holes 404. Circuit board 450 includes plate 455. Plate 455 includes connector holes 452 and mounting holes 454. Plate assembly 430 includes plate 435*a* and two screws (not shown). Plate 435*a* includes connector holes 432*a* and mounting holes 434*a*. Connectors 402 are designed to fit through connector holes 432 and 452. The two screws, passing through mounting holes 434*a* and mounting holes 454, secure interchangeable connector module 400 to circuit board 450 via mounting holes 404.

In FIG. 4*b*, plate assembly 430 further includes plate 435*b* and gaskets 436. Gaskets 436 are designed to improve electromagnetic shielding. For example, gaskets 436 may be composed of a rubber compound with embedded silver. For the exemplary embodiments shown in both FIG. 4*a* and FIG. 4*b*, in operation, interchangeable connector module 400 would also be coupled (not shown) to processing module 450.

B. Video Graphics Processor

Various exemplary embodiments of a video graphics processor are disclosed in the following:

1. U.S. patent application Ser. No. 09/353,495, filed Jul. 15, 1999, and entitled "MULTIPROCESSOR GRAPHICS ACCELERATOR," the disclosure of which is hereby incorporated, in its entirety, by reference;
2. U.S. patent application Ser. No. 09/354,462, filed Jul. 15, 1999, and entitled "APPARATUS AND METHOD OF DIRECTING GRAPHICAL DATA TO A DISPLAY DEVICE," the disclosure of which is hereby incorporated, in its entirety, by reference;
3. U.S. patent application Ser. No. 09/353,420, filed Jul. 15, 1999, and entitled "WIDE INSTRUCTION WORD GRAPHICS PROCESSOR," the disclosure of which is hereby incorporated, in its entirety, by reference; and
4. U.S. patent application Ser. No. 09/353,419, filed Jul. 15, 1999, and entitled "SYSTEM FOR DISPLAYING A TELEVISION SIGNAL ON A COMPUTER MONITOR," the disclosure of which is hereby incorporated, in its entirety, by reference.

C. Video Output System

Figure 5:
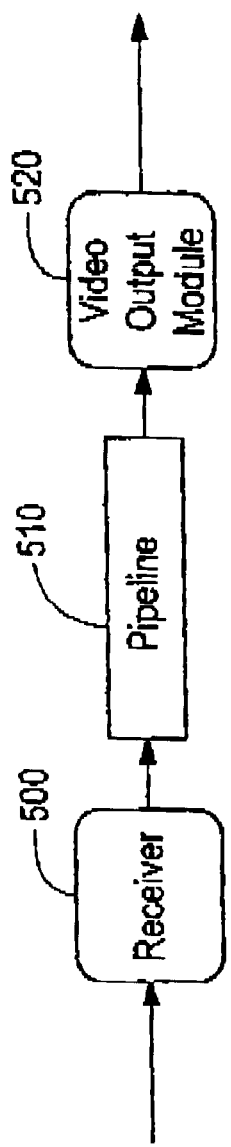
FIG. 5 shows an exemplary embodiment for a video output system for use in a video graphics workstation.

FIG. 5 shows an exemplary embodiment for video output system 140. In FIG. 5, video output system 140 includes receiver 500, pipeline 510, and video output module 520. Receiver 500 receives a video signal and forwards the received video signal to, for example, a buffer (not shown) for transfer to pipeline 510. The received video signal may be formatted in one of many different video data formats. For example, the received video signal may be an RGB encoded video signal or an RGBA encoded video signal. An RGB encoded video signal encodes an image in accordance with the amount of red, green, or blue contained in the image. An RGBA encoded video signal further encodes an image in accordance with the amount of opacity contained in the image.

The received video signal may also be a "YUV-Type" encoded video signal or a "YUVA-Type" encoded video signal. A "YUV-Type" encoded video signal encodes an image in accordance with the amount of luma (black and white) and color differences contained in the image. A "YUVA-Type" encoded video signal further encodes an image in accordance with the amount of opacity contained in the image. A "YUV-Type" encoded video signal includes, among other things, a YUV encoded video signal, a YCbCr encoded video signal, and a YPbPr encoded video signal. A "YUVA-Type" encoded video signal includes, among other things, a YUVA encoded video signal, a YCbCrA encoded video signal, and a YPbPrA encoded video signal.

Pipeline 510 post-processes the forwarded video signal and forwards the post-processed video signal to video output module 520. The process of post-processing includes, among other things, region of interest selection, frame rate matching, spatial adaptation, up sampling, down sampling, gamma insertion, gamma removal, and color space conversion. Spatial adaptation includes, among other things, scaling and picture framing. Picture framing includes, among other things, letter boxing. For purposes of understanding and reference, and without intending to limit the meaning the above-identified processes have to a person of ordinary skill in the art, listed below are definitions for the above-identified processes not previously defined:

| PROCESS | DEFINITION |
| --- | --- |
| Region of Interest Selection | Process of selecting a portion of an image for post-processing |
| Frame Rate Matching | See Section E. |
| Picture Framing and Letter Boxing | Process of positioning an image on a background image |

In addition, post-processing may include addressing on a frame-by-frame basis the video signal being post-processed. In frame-by-frame addressing, video output system 140 may post-process one frame of a video signal different than, for example, the next frame of the video signal. Also, post-processing may include changing a frame of video data into interlaced fields of video data. In using this process, video output system 140 "blends" single or multiple lines from a frame in an input video signal into a single line in an output video signal, e.g., 3:2 pull-down.

Video output module 520 converts the post-processed video signal to a formatted video signal. The formatted video signal may be an analog video signal or a digital video signal.

Typically, video output system 140 also includes a generator locking device, referred to as a genlock, which allows the synchronized display of graphics and video. A genlock may lock video output system 140 to, for example, video graphics processor 130. In addition, regardless of whether video output system 140 is locked to video graphics processor 130, a genlock may lock video output module 520 to another source, e.g., an external clock, an internal clock, etc.

In a further embodiment of these exemplary embodiments, video output module 520 includes an ancillary data injector for inserting ancillary data into the post-processed video signal prior to conversion of the post-processed video signal. As noted above, ancillary data includes, among other things, audio data and close captioning data.

Figure 6:
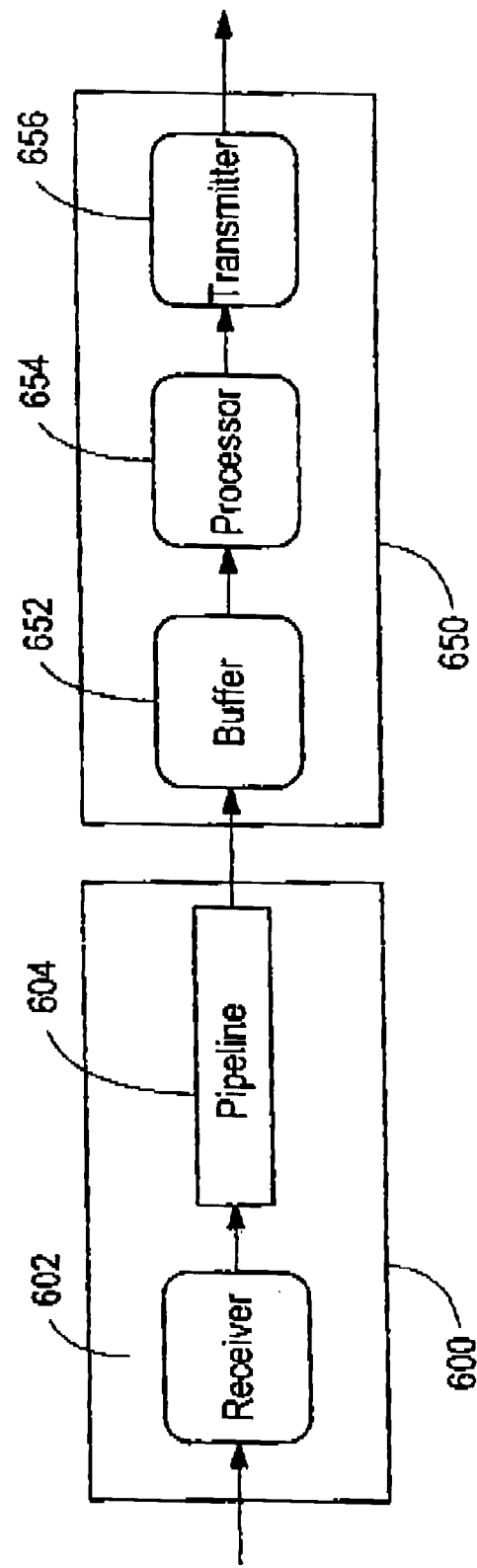
FIG. 6 shows an exemplary embodiment for a scalable video output system for use in a video graphics workstation.

FIG. 6 shows an exemplary embodiment for a scalable video output system 140. In this embodiment, video output system 140 includes video processing module 600 and video output module 650. Video processing module 600 includes receiver 602 and pipeline 604. As discussed above in regard to the embodiments shown in FIG. 3, video processing module 600 receives a video signal, post-processes the received video signal, and forwards the post-processed video signal to video output module 650. Video processing module 600 may include a generator locking device for locking video processing module 600 to, for example, video graphics processor 130.

Video output module 650 includes buffer 652, processor 654, and transmitter 656. Video processing module 600 forwards the post-processed video signal to buffer 652 for transfer to processor 654. Processor 654 converts the post-processed video signal into a formatted video signal, e.g., an analog composite video signal, a parallel digital component video signal, etc. The formatted video signal is then forwarded to transmitter 656. In alternate embodiments of the invention, video output module 650 may include an ancillary data injector for inserting ancillary data into the post-processed video signal.

In these exemplary embodiments, video output module 650 and video processing module 600 are separate modules coupled together via, for example, male/female cables. In one embodiment, video output module 650 is a daughter-board that plugs into video processing module 600. The separation of the various functions of a video output system into a video output module and a video processing module allows for the separation of video output module 650 and video processing module 600.

In turn, the separation of video output module 650 from video processing module 600 allows for the configuration of various video output modules, each configured to process and produce different video signal formats. Because the "output" functions of video output system 140 have been separated from the "processing" functions of video output system 140, video output module 650 may be "exchanged" without the need to replace video processing module 600. Thus, when a user wants to output, for example, a serial digital component video signal instead of an analog composite video signal, the user "exchanges" the video output module configured for the analog composite video signal with a video output module configured for the serial digital component video signal. In turn, processor 654 (on the "new" video output module) signals video processing module 600 of the new configuration.

As an interchangeable connector module, video output module 650 may be mounted on video processing module 600, a processing module, in the manner shown in FIGS. 4a and 4b.

D. Exemplary Video Graphics Applications

Figure 7:
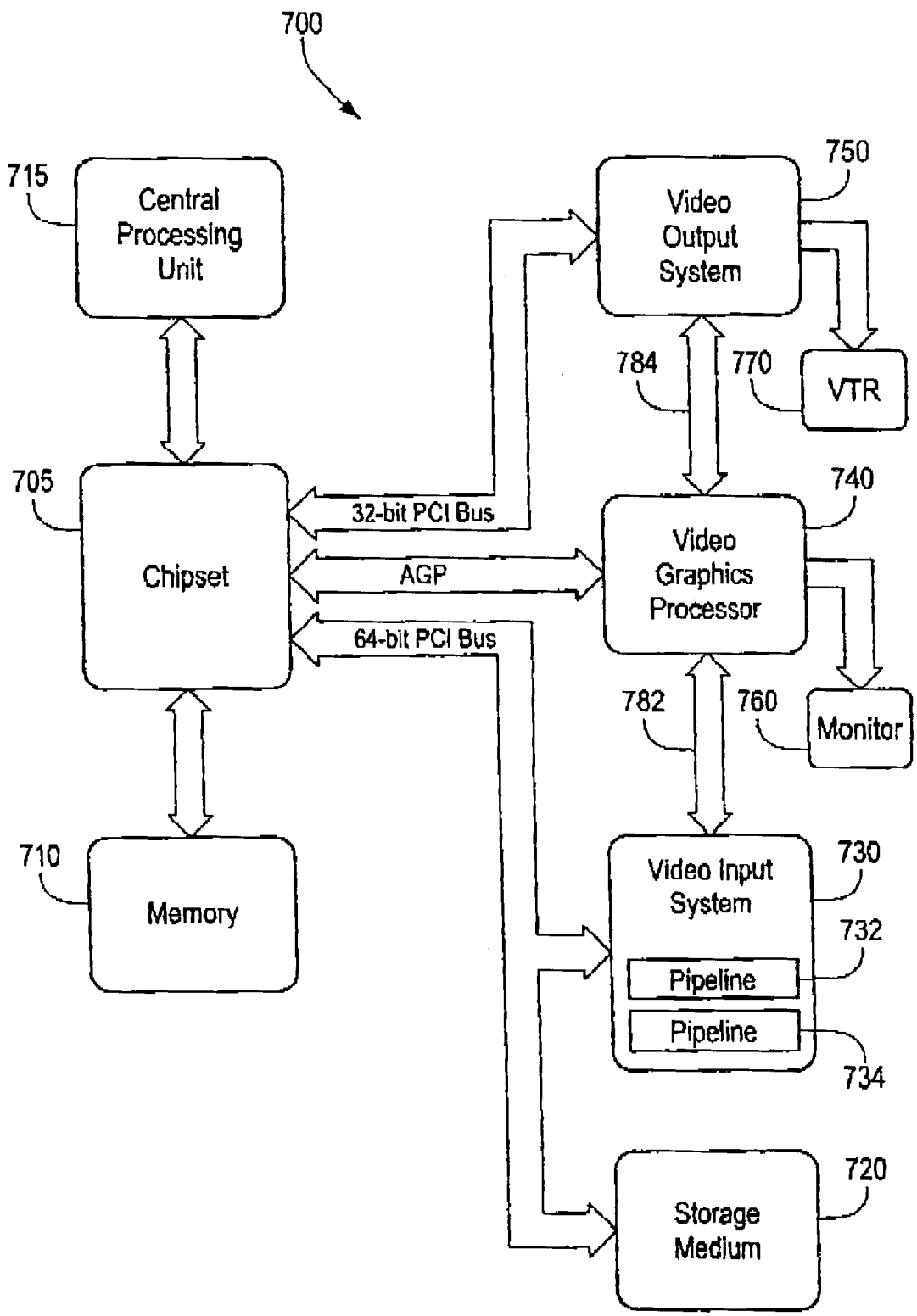
FIG. 7 shows an exemplary video graphics workstation for carrying out various exemplary video graphics applications.

FIG. 7 shows an exemplary video graphics workstation implementing one embodiment of the invention for carrying out variou exemplary video graphics applications. In this embodiment, video input system 730 includes two pipelines, pipeline 732 and pipeline 734. In addition, video output system 750 forwrds a formatted video signal to a video tape recorder for recordation.

In one application, video graphics workstaion 700 aptures a live video signal. First, video graphics workstation 6700 receives the live video signal. Next, the received video signal is pre-processed in pipeline 732 of video input system 730. Then, the pre-processed video signal is forwarded, via the 64-bit PCI bus, to storage medium 720.

In another application, video graphics workstation 700 captures and displays a live video signal. First, video graphics workstation 700 receives the live video signal. Next, the received video signal is pre-processed in both pipeline 732 and pipeline 734 of video input system 730. Then, the pre-processed video signal from pipeline 732 is forwarded, via the 64-bit PCI bus, to storage medium 720. In the interim, the pre-processed video signal from pipeline 734 is forwarded, via local bus 782, to video graphics processor 740 for display on computer monitor 760. The pre-processed video signal from pipeline 734 may also be forwarded to video graphic processor 740 via the 64-bit PCI bus and the AGP. In alternate embodiments, the pre-processed video signal from pipeline 734 may be forwarded, via the 64-bit bus and the 32-bit bus, to video output system 750 for recordation on video tape recorder 770.

In another application, video graphics workstation 700 plays back a stored video signal. First, video graphics workstation 700 forwards a stored video signal, via the 64-bit PCI bus to video input system 730. Next, the stored video signal is pre-processed in pipeline 732. Then, the pre-procesed video signal is forwarded, via local bus 782, to video graphics processor 740 for display on computer monitor 760. In an alternate embodiment, the pre-processed video signal may also be forwarded, via local bus 784, to video output system 750 for recordation on video tape recorder 770.

In another application, video graphics workstation 700 processes a stored video signal, for example, performs a two-dimensional or three-dimensional effect on the stored video signal, and displays the processed video signal. First, video graphics workstation 700 forwards a stored video signal, via the 64- bit PCI bus, to video input system 730. Next, the stored video signal is pre-processed in pipeline 732. Then, the pre-processed video signal is forwarded, via local bus 782, to video graphics processor 740 for "effects" processing an display on a computer monitor 760. In an alternate embodiment, the processed video signal may also be forwarded, via local bus 784, to video output system 750 for recordation on video tape recorder 770.

In another application, video graphics workstation 700 pre-processes a stored video signal and saves the pre-processed video signal. First, video graphics workstation 700 forwards a stored video signal, via the 64-bit PCI bus, to video input system 730. Next, the stored video signal is pre-processed in pipeline 732. Then, the pre-processed video signal is forwarded, via the 64-bit PCI bus, to storage medium 720. In alternate embodiments, the pre-processed video signal may be forwarded, via the 64-bit PCI bus, to central processing unit 715 or to memory 710.

In another application, video graphics workstation 700 processes a stored video signal and saves the processed video signal. First, video graphics workstation 700 forwards a stored video signal, via the 64-bit PCI bus, to video input system 730. Next, the stored video signal is pre-processed in pipeline 732. Then, the pre-processed video signal is forwarded, via local bus 782, to video graphics processor 740 for "effects" processing. Last, the processed video signal is forwarded, via local bus 782, to video input system 730. Video input system 730 may pre-process the processed video signal, for example, to convert the processed signal to a format better suited for saving, or forward the processed signal, via the 64-bit PCI bus, to storage medium 720.

In another application, video graphics workstation 700 combines a live video signal, a stored video signal, and graphics information and records the combined video signal. First, video graphics workstation 700 receives a live video signal. Next, the received video signal is pre-processed in pipeline 732 of video input system 730. In the interim, video graphics workstation 700 forwards a stored video signal to video input system 730. Next, the stored video signal is pre-processed in pipeline 734. Then, graphics information (via the AGP), the pre-processed video signal from pipeline 732 (via local bus 782), and the pre-processed video signal from pipeline 734 (via local bus 782) are forwarded to video graphics processor 740 for "effects" processing. Last, the processed video signal is forwarded, via local bus 784, to video output system 750 for recordation on video tape recorder 770.

E. Frame Rate Matching

As discussed above, a frame is a single complete image. Typically, a frame is represented, in a video graphics workstation, with frame data. In general, frame rate is how fast a new frame of frame data, in other words, an new image, is available for processing or display. The process of frame rate matching includes, among other things, matching the frame rate of, for example, a video signal to the frame rate of, for example, an output device. Typically, in a video graphics workstation, the process of frame rate matching occurs in the video output system.

Figure 8:
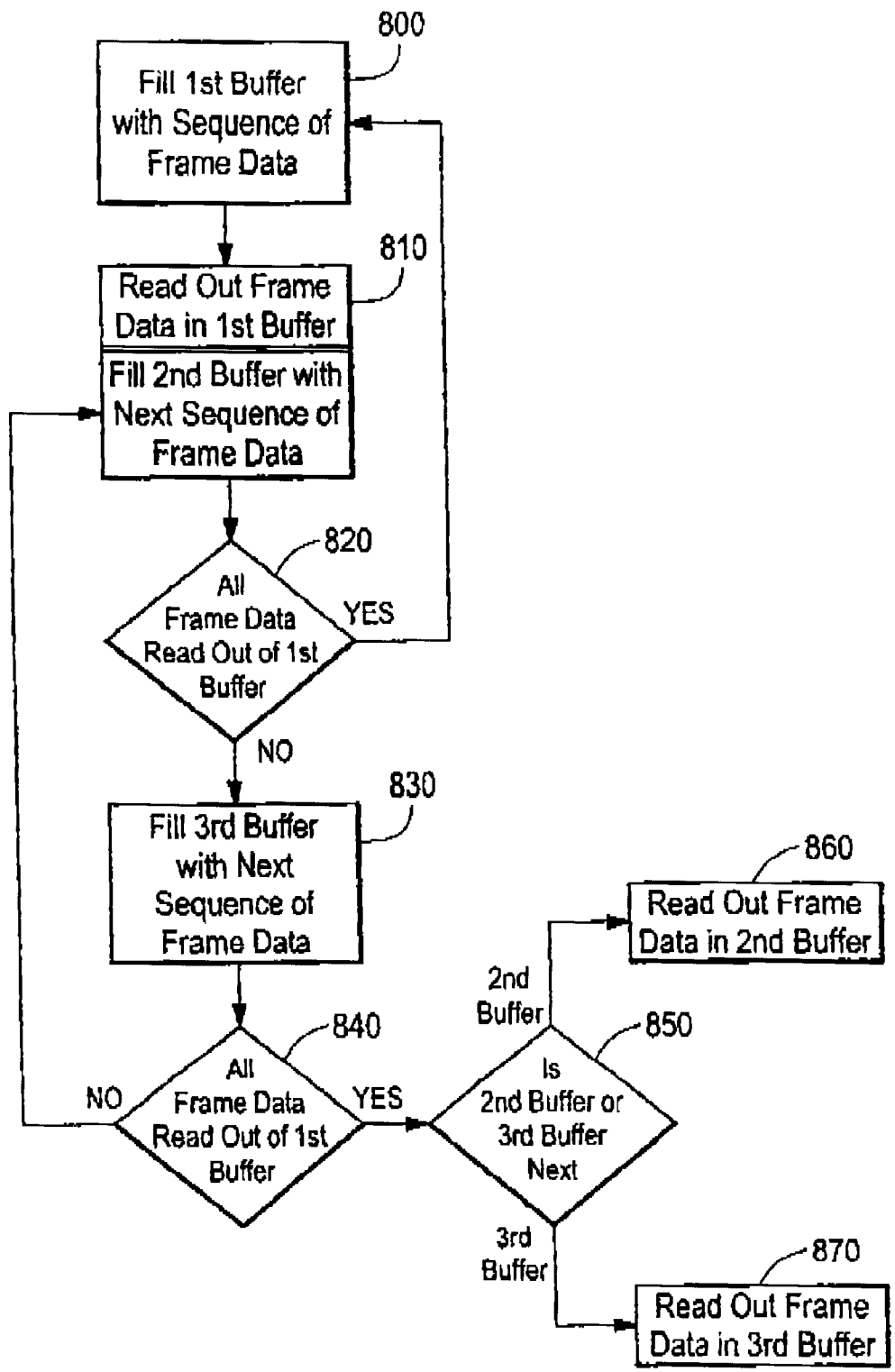
FIG. 8 shows an exemplary process in a video graphics workstation for video signal frame rate matching.

FIG. 8 shows an exemplary process in a video graphics workstation for video signal frame rate matching. The process begins at step 800, in which the video graphics workstation fills a first buffer with a sequence of frame data. Next, at step 810, the workstation reads out the frame data in the first buffer and, at substantially the same time, fills a second buffer with the next sequence of frame data. The process continues at step 820, in which the video graphics workstation determines whether all of the frame data has been read out of the first buffer. If yes, the video graphics workstation fills the first buffer with the next sequence of frame data. If no, the video graphics workstation, at step 830, fills the third buffer with the next sequence of frame data.

Next, at step 840, the video graphics workstation determines whether all of the frame data in the first buffer has been read out of the first buffer. If no, the video graphics workstation begins to fill the second buffer with the next sequence of frame data. If yes, the video graphics workstation, at step 850, determines whether the second buffer or the third buffer has the most current and most complete frame data. If the second buffer has the most current and most complete frame data, the video graphics workstation, at step 860, reads the frame data out of the second buffer. If the third buffer has the most current and most complete frame data, the video graphics workstation, at step 870, reads the frame data out of the third buffer.

In a further embodiment of the invention, the buffer determined not to have been filled with the most current and most complete frame data becomes a remainder buffer. In this embodiment, the video graphics workstation fills the remainder buffer with the next sequence of frame data. Then, if all of the frame data has not been read out of the buffer determined to have been filled with the most current and most complete frame data, the video graphics workstation fills the first buffer with the next sequence of frame data. The video graphics workstation continues to alternate between the remainder buffer and the first buffer until all of the frame data has been read out of the buffer determined to have been filled with the most current and most complete frame data.

Thus, in operation, the three buffers change "roles." For example, the buffer now being filled may, depending upon the circumstances, next become either the buffer being read or the buffer not being either filled or read. Or, the buffer now being read may, depending upon the circumstances, next become either the buffer being filled or the buffer not being either filled or read. Or, the buffer now not being either filled or read may, depending upon the circumstances, next become either the buffer being read or the buffer being filled.

In both embodiments of the invention, a buffer may contain the most complete frame data when the buffer is less than 100% full. Typically, however, a buffer contains the most complete frame data when the buffer is 100% full. In addition, a buffer may contain one or more frames of frame data. Typically, however, a buffer contains one frame of frame data.

Further, both embodiments of the invention are scalable. In other words, both embodiments of the invention may be used to match any frame rates. For example, a frame rate to be matched may be 24/1.001 frames/second, or 24 frames/ second, or 25 frames/second, or 29.97 frames/second, or 30/1.001 frames/second, or 30 frames/second, or 50 frames/second, 60/1.001 frames/second, 60 frames/second or 75 frames/second. Also, the frame rates being matched may be the same frame rate. Or, in the alternative, the frame rates being matched may be multiples of each other.

F. Packing and Unpacking Video Data

As discussed above, an image is composed of a raster of picture elements, referred to as pixels. Pixels are the smallest "units" on a screen that can be given a color (represented with color data) and an opacity (represented with alpha data). In general, a pixel is represented by some number of bits stored, for example, in memory. For example, a pixel may be 1-bit in length, 8-bits in length, 10-bits in length, 24-bits in length, or 32-bits in length.

In turn, memory stores data in segments, with each segment being some number of bits. For example, memory may be capable of storing data in 32-bit segments or 64-bit segments. It may inefficient, however, to store, for example, one 8-bit pixel in a 32-bit memory segment. But, four 8-bit pixels may be "packed" in a 32-bit memory segment. In the same way, four 24-bits pixels may be packed in three 32-bit memory segments. Typically, in a video graphics workstation, the process of packing and unpacking pixels occurs in the video input system.

Figure 9A:
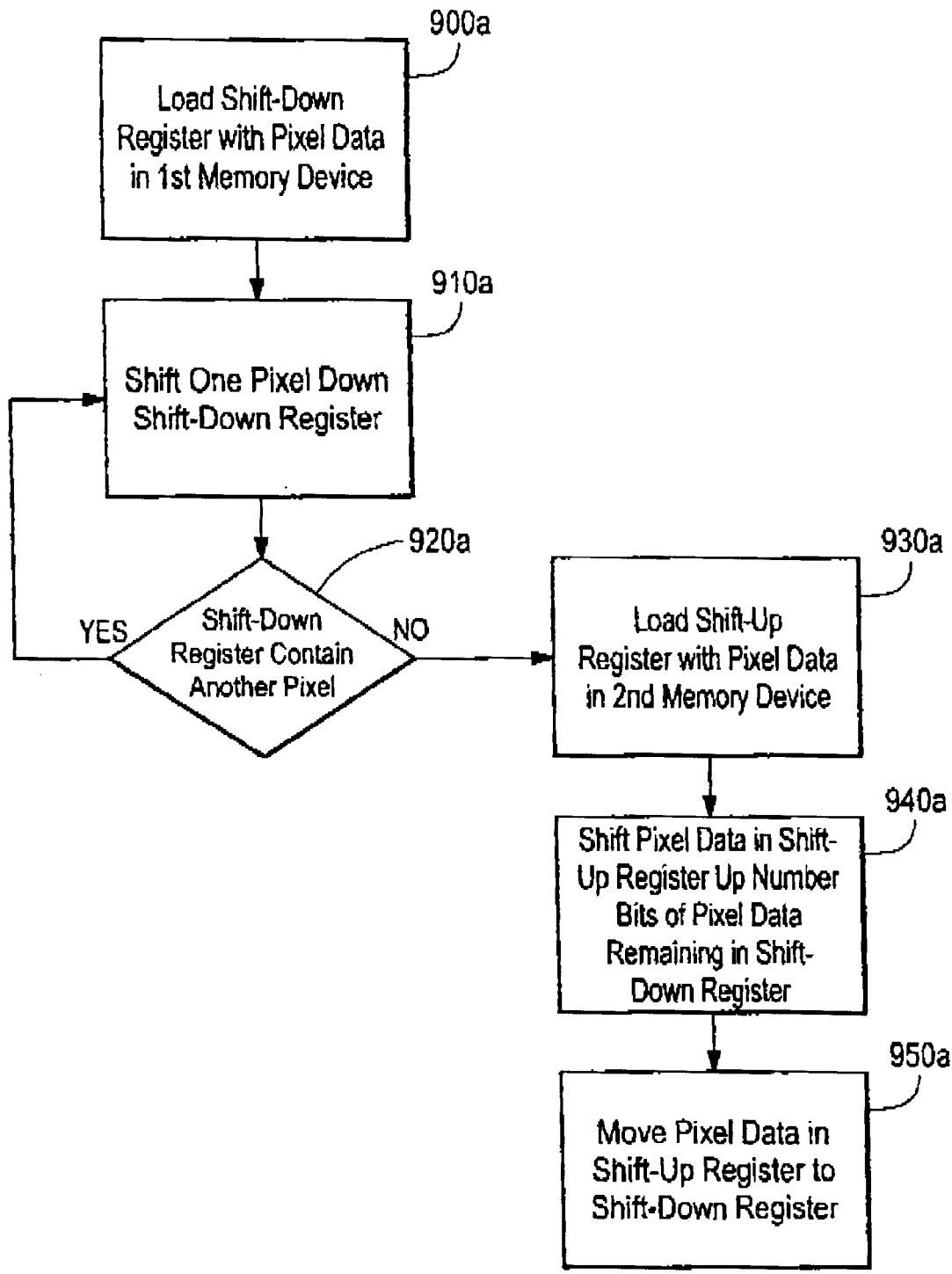
FIGS. 9a and 9b show an exemplary process in a video graphics workstation for packing and unpacking pixels.
Figure 9B:
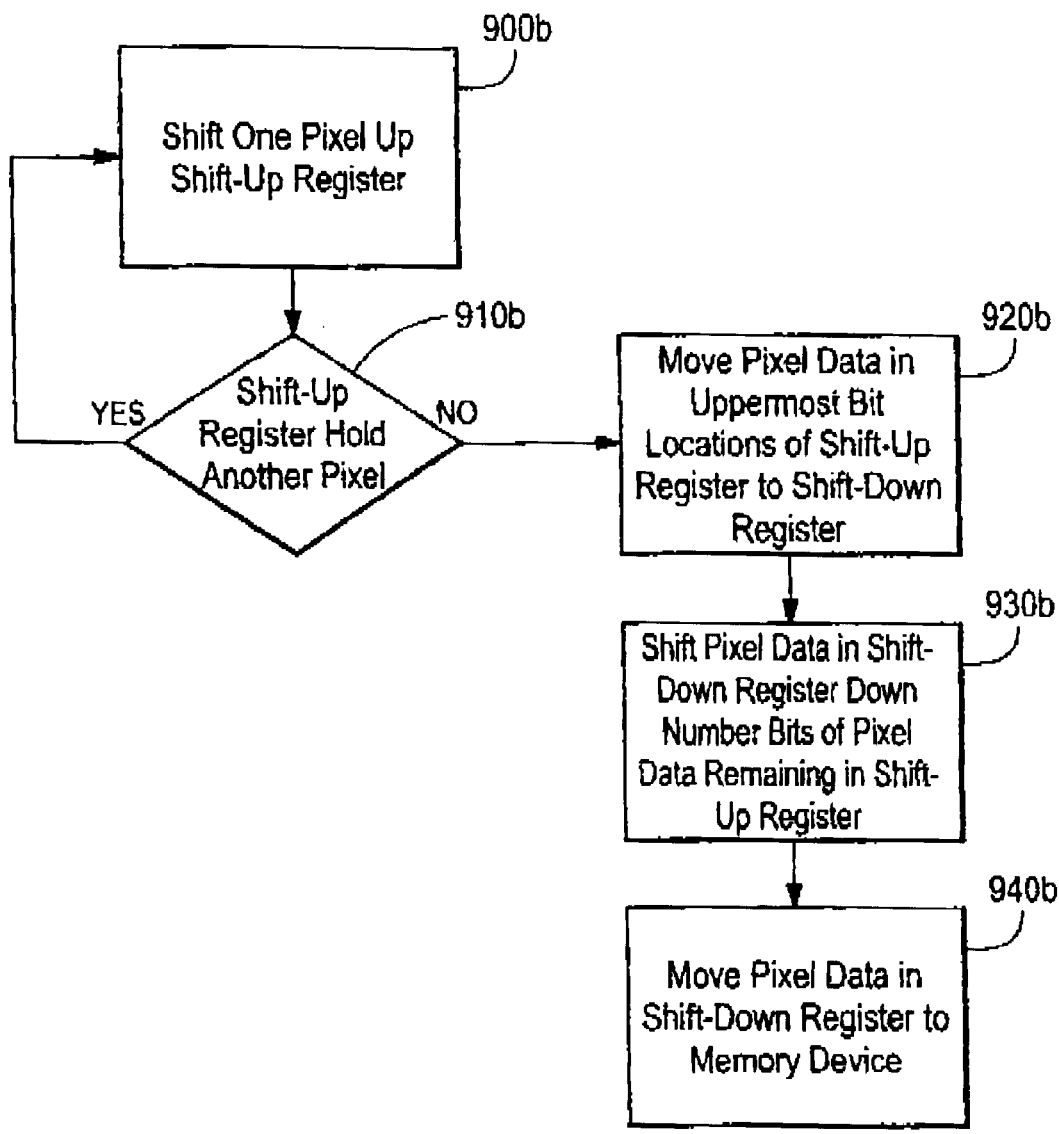

FIGS. 9a and 9b show an exemplary process in a video graphics workstation for packing and unpacking pixels. In particular, FIG. 9a shows an exemplary process in a video graphics workstation for unpacking pixels. The process begins at step 900a, in which the video graphics workstation loads a shift-down register with the pixel data contained in a first memory device. In this embodiment, the first memory device has a bit storage capacity smaller in size than the bit storage capacity of the shift-down register. For example, the first memory device may be 64-bits in length and the shift-down register may be 80-bits in length. Next, at step 910a, the video graphics workstation shifts one complete pixel of pixel data down the shift-down register. For example, one 24-bit pixel is shifted down the shift-down register.

Then, at step 920a, the video graphics workstation determines whether the shift-down register contains another complete pixel of pixel data. If yes, the video graphics workstation shifts another complete pixel of pixel data down the shift-down register. If no, the video graphics workstation, at step 930a, loads a shift-up register with the pixel data contained in a second memory device. In this embodiment, the second memory device is contiguous with the first memory device and has the same bit storage capacity as the first memory device. Also, the shift-up register has the same bit storage capacity as the shift-down register.

Next, at step 940a, the video graphics workstation shifts the pixel data in the shift-up register up the number of bits of pixel data remaining in the shift-down register. For example, if the shift-down register has 16 bits of pixel data remaining, then the video graphics workstation shifts the pixel data in the shift-up register up 16 bits. Then, at step 950a, the video graphics workstation moves the pixel data in the shift-up register to the shift-down register, placing the shifted-up pixel data in the same bit locations in the shift-down register the shifted-up pixel data occupied in the shift-up register. For example, if the shifted-up pixel data occupied bit locations 16 through 63 in the shift-up register, then the video graphics workstation moves the shifted-up pixel data to bit locations 16 through 63 in the shift-down register.

FIG. 9b shows an exemplary process in a video graphics workstation for packing pixels. In this embodiment, the memory device in which the pixel data will be packed has a bit storage capacity smaller in size than the bit storage capacity of the shift-up register. For example, the memory device may be 64-bits in length and the shift-up register may be 80-bits in length.

The process begins at step 900b, in which the video graphics workstation shifts one complete pixel of data up a shift-up register. Next, at step 910b, the video graphics workstation determines whether the shift-up register has capacity to hold another complete pixel of pixel data. If yes, the video graphics workstation shifts another complete pixel of pixel data up the shift-up register. If no, the video graphics workstation, at step 920b, moves the pixel data in the uppermost bit locations of the shift-up register to a shift-down register, placing the moved pixel data in the same bit locations in the shift-down register the moved pixel data occupied in the shift-up register. For example, if the moved pixel data occupied bit locations 16 through 63 in the shift-up register, then the video graphics workstation moves the shifted-up pixel data to bit locations 16 through 63 in the shift-down register.

The amount of pixel data moved from the uppermost bit locations in the shift-up register depends upon the bit storage capacity of the memory device in which the pixel data will be packed. For example, if the memory device is 64-bits in length, then the video graphics workstation moves the 64 uppermost bits of the shift-up register to the shift-down register. Also, the shift-down register has the same bit storage capacity as the shift-up register.

Next, at step 930b, the video graphics workstation shifts the pixel data in the shift-down register down the number of bits of pixel data remaining in the shift-up register. For example, if the shift-up register has 16 bits of pixel data remaining, then the video graphics workstation shifts the pixel data in the shift-down register down 16 bits. Then, at step 940b, the video graphics workstation moves the contents of the shift-down register to the memory device.

In all embodiments of the invention, one complete pixel of pixel data may include a bit stream of color data, a bit stream of alpha data, or a bit stream of color data and alpha data. The color data may be RGB encoded or "YUV-Type" encoded. In addition, the color data and alpha data may be RGBA encoded or "YUVA-Type" encoded.

The various embodiments of the invention may be implemented in any conventional computer programming language. For example, the various embodiments may be implemented in a procedural programming language (for example, "C") or an object-oriented programming language (for example, "C++" or JAVA). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), pre-loaded with a computer system (for example, on system ROM or fixed disk), or distributed from a server or electronic bulletin board over the network (for example, the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A workstation for processing and producing video signals, the workstation comprising:
 a storage medium;
 a video input system comprising:
  a video input module for receiving and forwarding one or more live video signals, the video input module producing a forwarded video signal for each received live video signal;
  a first video pipeline for pre-processing $VS_1$, wherein, in one configuration, $VS_1$ is a first stored video signal received from the storage medium, and, in another configuration, $VS_1$ is one of the forwarded video signals produced in the video input module, the first video pipeline producing a first pre-processed video signal; and
  a second video pipeline for pre-processing $VS_2$, wherein, in one configuration, $VS_2$ is the same video signal being pre-processed in the first video pipeline, and, in another configuration, $VS_2$ is one of the other forwarded video signals produced in the video input module, and, in another configuration, $VS_2$ is a second stored video signal received from the storage medium, the second video pipeline producing a second pre-processed video signal, wherein $VS_2$ is different than the first pre-processed video signal; and
 a video graphics processor for processing $VS_3$, wherein $VS_3$ is a third stored video signal in one configuration, the first pre-processed video signal in another configuration, or and the second pre-processed video signal in another configuration, the video graphics processor producing a processed video signal.

2. The workstation according to claim 1 wherein the video input module includes an ancillary data extractor for removing ancillary data from at least one of the live video signals.

3. The workstation according to claim 1, further comprising:
 a video output system, the video output system producing a formatted video signal.

4. The workstation according to claim 3, the video output system further comprising:
 a receiver for receiving $VS_4$, wherein, in one configuration, $VS_4$ is the first pre-processed video signal, and, in another configuration, $VS_4$ is the second pre-processed video signal, of and, in another configuration, $VS_4$ the processed video signal;
 a video pipeline for post-processing $VS_4$, the video pipeline operating in conjunction with the video graphics processor and producing a post-processed video signal; and
 a video output module for converting the post-processed video signal, the video output module producing the formatted video signal.

5. The workstation according to claim 4 wherein the video output module includes an ancillary data injector for inserting ancillary data into the post-processed video signal.

6. The workstation according to claim 4 wherein the video output module includes a generator locking device.

7. The workstation according to claim 4 wherein the process of post-processing includes region of interest selection.

8. The workstation according to claim 4 wherein the process of post-processing includes frame rate matching.

9. The workstation according to claim 4 wherein the process of post-processing includes spatial adaptation.

10. The workstation according to claim 9 wherein the process of spatial adaptation includes scaling.

11. The workstation according to claim 9 wherein the process of spatial adaptation includes picture framing.

12. The workstation according to claim 11 wherein the process of picture framing includes letter boxing.

13. The workstation according to claim 4 wherein the process of post-processing includes changing the sample rate of the video signal being post-processed.

14. The workstation according to claim 4 wherein the process of post-processing includes gamma removal.

15. The workstation according to claim 4 wherein the process of post-processing includes gamma insertion.

16. The workstation according to claim 4 wherein the process of post-processing includes color space conversion.

17. The workstation according to claim 4 wherein the process of post-processing includes changing frames of video data into interleaved fields of video data.

18. The workstation according to claim 4 wherein the process of post-processing includes addressing on a frame-by-frame basis the video signal being pre-processed.

19. The workstation according to claim 4 wherein the video output system is a Peripheral Component Interconnect circuit board.

20. The workstation according to claim 4, wherein the video output module is detachably coupled to a video processing module that includes the receiver and the video pipeline.

21. The workstation according to claim 20, wherein the video output module is a daughterboard module that couples to the video processing module.

22. The workstation according to claim 3 wherein the video output system includes a generator locking device.

23. The workstation according to claim 3 wherein the formatted video signal is VS, wherein VS is an analog composite video signal, an analog component video signal, a serial digital composite video signal, a serial digital component video signal, a parallel digital composite video signal, or a parallel digital component video signal.

24. The workstation according to claim 1 wherein the received live video signal is VS, wherein VS is an analog composite video signal, an analog component video signal, a serial digital composite video signal, a serial digital component video signal, a parallel digital composite video signal, or a parallel digital component video signal.

25. The workstation according to claim 1 wherein the formatted video signal includes D, wherein D is color data, alpha data, or color and alpha data.

26. The workstation according to claim 1 wherein at least one of the pre-processed video signals is e-VS, wherein e-VS is an RGB encoded video signal, an RGBA encoded video signal, a YUV-Type encoded video signal, or a YUVA-Type encoded video signal.

27. The workstation according to claim 1 wherein at least one of the pre-processed video signals is forwarded to the storage medium.

28. The workstation according to claim 1 wherein the process of pre-processing includes changing the sample rate of the video signal being pre-processed.

29. The workstation according to claim 1 wherein the process of pre-processing includes gamma removal.

30. The workstation according to claim 1 wherein the process of pre-processing includes gamma insertion.

31. The workstation according to claim 1 wherein the process of pre-processing includes color space conversion.

32. The workstation according to claim 1 wherein the process of pre-processing includes dithering.

33. The workstation according to claim 1 wherein the process of pre-processing includes scaling.

34. The workstation according to claim 1 wherein the process of pre-processing includes addressing on a frame-by-frame basis the video signal being pre-processed.

35. The workstation according to claim 1 wherein the video input system is a Peripheral Component Interconnect circuit board.

36. The workstation according to claim 1, wherein an output of the first video pipeline is not coupled to an input of the second video pipeline.

37. The workstation according to claim 1, wherein the video input module is detachably coupled to a processing module that includes the first and second video pipelines.

38. The workstation according to claim 37, wherein the video input module is a daughterboard module that couples to the video processing module.

39. A workstation for processing and producing video signals, the workstation comprising:
　a video input system;
　a storage medium;
　a video graphics processor for processing a video signal; and
　a video output system comprising:
　　a receiver for receiving a video signal from the video input system in one configuration, from the storage medium in another configuration, and from the video graphics processor in another configuration;
　　a video pipeline for post-processing the received video signal, the video pipeline producing a post-processed video signal; and
　　a video output module for converting the post-processed video signal, the video output module producing a formatted video signal.

40. The workstation according to claim 39, wherein the video output module is detachably coupled to a video processing module that includes the receiver and the video pipeline.

41. The workstation according to claim 40, wherein the video output module is a daughterboard module that couples to the video processing module.

42. A workstation for processing and producing video signals, the workstation comprising:
　　a video graphics processor for processing a video signal, the video graphics processor producing a processed video signal; and
　a video output system comprising:
　　a video processing module for post-processing the processed video signal, the video processing module producing a post-processed video signal and having a connector for coupling a video output module; and
　　a video output module for converting the post-processed video signal, the video output module having a specific configuration and producing a formatted video signal, the specific configuration of the video output module setting the characteristics of the video processing module.

43. The workstation according to claim 39 or claim 42, the video output module further comprising:
　a buffer for storing the post-processed video signal;
　a processor for converting the post-processed video signal into the formatted video signal; and
　a transmitter for transmitting the formatted video signal.

44. The workstation according to claim 39 or claim 42 wherein the video output module includes an ancillary data injector for inserting ancillary data into the post-processed video signal.

45. The workstation according to claim 42, wherein the video output module is detachably coupled to the video processing module.

46. The workstation according to claim 45, wherein the video output module is a daughterboard module that couples to the video processing module.

47. The workstation according to claim 42, wherein the video output module includes a processor that is configured to inform the video processing module of its specific configuration.

48. A workstation for processing and producing a video signal, the workstation comprising:
　a video input system comprising:
　　a video input module for converting a live video signal, the video input module having a specific configuration and producing a formatted video signal; and
　　a video processing module for preprocessing the formatted video signal, the video processing module producing a pre-processed video signal, the video processing module having a connector for coupling the video input module, the specific configuration of the video input module setting the characteristics of the video processing module; and
　　a video graphics processor for processing the pre-processed video signal, the video graphics processor producing a processed video signal.

49. The workstation according to claim 48 the video input module further comprising:
　a first receiver for receiving the live video signal;
　a processor for converting the live video signal into the formatted video signal; and
　a buffer for storing the formatted video signal.

50. The workstation according to claim 48 wherein the video input module includes an ancillary data extractor for removing ancillary data from the first live video signal.

51. The workstation according to claim 48, wherein the video input module is detachably coupled to the video processing module.

52. The workstation according to claim 51, wherein the video input module is a daughterboard module that couples to the video processing module.

53. The workstation according to claim 48, wherein the video input module includes a processor that is configured to inform the video processing module of its specific configuration.

54. A workstation for processing and producing a video signal, the workstation comprising:
- a video input system comprising:
  - a video input module for receiving and forwarding one or more live video signals, the video input module producing a forwarded video signal for each received live video signal;
  - a first video pipeline for pre-processing $VS_1$, wherein, in one configuration, $VS_1$ is a first stored video signal, and, in another configuration, $VS_1$ is one of the forwarded video signals produced in the video input module, the first video pipeline producing a first pre-processed video signal; and
  - a second video pipeline for pre-processing $VS_2$, wherein, in one configuration, $VS_2$ is the same video signal being pre-processed in the first video pipeline, and, in another configuration, $VS_2$ is one of the other forwarded video signals produced in the video input module, of and, in another configuration, $VS_2$ is a second stored video signal, the second video pipeline producing a second pre-processed video signal; and
- a video output system comprising:
  - a receiver for receiving $VS_3$, wherein, in one configuration, $VS_3$ is a third stored video signal, and, in another configuration, $VS_3$ is the first pre-processed processed video signal, and, in another configuration, $VS_3$ is the second pre-processed video signal;
  - a video pipeline for post-processing $VS_3$, the video pipeline producing a post-processed video signal; and
  - a video output module for converting the post-processed video signal, the video output module producing a formatted video signal.

55. The workstation according to claim 54 wherein the video input module includes an ancillary data extractor for removing ancillary data from the received live video signal.

56. The workstation according to claim 54 wherein the video output module includes an ancillary data injector for inserting ancillary data into the post-processed video signal.

57. The workstation according to claim 54, wherein:
- the video input module is detachably coupled to a video input system processing module, wherein the video input system processing module includes the first and second video pipelines; and
- the video output module is detachably coupled to a video output system processing module, wherein the video output system processing module includes the receiver and the video pipeline.

58. The workstation according to claim 57, wherein:
- the video input module is a daughterboard module that couples to the video input system processing module; and
- the video output module is a daughterboard module that couples to the video output system processing module.

59. A workstation for processing and producing a video signal, the workstation comprising:
- a video input system comprising:
  - a video input module for converting a live video signal, the video input module having a specific configuration and producing a formatted video signal; and
  - a video processing module for pre-processing the formatted video signal, the video processing module producing a pre-processed video signal, the video processing module having a connector for coupling the video input module, the specific configuration of the video input module setting the characteristics of the video processing module; and
- a video output system comprising:
  - a video processing module for post-processing the pre-processed video signal, the video processing module producing a post-processed video signal and having a connector for coupling a video output module; and
  - a video output module for converting the post-processed video signal, the video output module having a specific configuration and producing a formatted video signal, the specific configuration of the video output module setting the characteristics of the video processing module.

60. The workstation according to claim 59 wherein the video input module includes an ancillary data extractor for removing ancillary data from the live video signal.

61. The workstation according to claim 59 wherein the video output module includes an aillary data injector for inserting ancillary data into the post-processed video signal.

62. The workstation according to claim 59, wherein:
- the video input module is detachably coupled to the video input system video processing module; and
- the video output module is detachably coupled to the video output system video processing module.

63. The workstation according to claim 62, wherein:
- the video input module is a daughterboard module that couples to the video input system processing module; and
- the video output module is a daughterboard module that couples to the video output system processing module.

64. The workstation according to claim 59, wherein:
- the video input module includes a processor that is configured to inform the video input system processing module of its specific configuration; and
- the video output module includes another processor that is configured to inform the video output system processing module of its specific configuration.

* * * * *